United States Patent [19]

Freeman

[11] 3,732,537
[45] May 8, 1973

[54] ROTATING WARNING LIGHT WITH AN INTEGRATED SPOTLIGHT

[76] Inventor: William D. Freeman, 3640 Overton Crossing, Memphis, Tenn. 38127

[22] Filed: May 7, 1971

[21] Appl. No.: 141,262

[52] U.S. Cl. ..................340/50, 240/24, 240/41.6, 240/61.13, 340/81 R, 340/92
[51] Int. Cl. ...........................B60q 1/52, F21m 3/00
[58] Field of Search......................340/25, 49, 50, 76, 340/84, 87, 89, 92, 133, 366 D, 373; 240/7.1 E, 49

[56] References Cited

UNITED STATES PATENTS

| | | | |
|---|---|---|---|
| 1,317,023 | 9/1919 | Koehler | 240/49 |
| 2,099,975 | 11/1937 | Hackman | 340/49 |
| 2,460,585 | 2/1949 | Kennelly | 340/50 UX |
| 2,699,536 | 1/1955 | Roth et al. | 340/50 X |
| 2,719,281 | 9/1955 | Roth et al. | 340/25 |
| 2,823,366 | 2/1958 | Schmitz | 340/49 |
| 3,117,302 | 1/1964 | Cardarelli et al. | 340/50 |
| 3,537,066 | 10/1970 | Stingl | 340/25 |

Primary Examiner—John W. Caldwell
Assistant Examiner—Kenneth N. Leimer
Attorney—John R. Walker, III

[57] ABSTRACT

A rotating warning light intended to be mounted on the roof of a vehicle which includes four rotating lightbulbs facing outwardly in four different directions. Three of the lightbulbs have colored lenses, e. g., red or blue, and the remaining lightbulb has a clear lens defining a spotlight under certain conditions. The device includes structure for (1) remotely moving the spotlight about a horizontal axis so the beam therefrom may be lowered or raised; (2) continuous operation of the four lightbulbs simultaneously while they rotate, thus providing a highly conspicuous wig-wag effect; (3) selectively reversing the direction of rotation of the platform supporting the four lightbulbs, thus facilitating optimum maneuverability of the spotlight; (4) continuous operation of the spotlight while simultaneously flashing the colored lights, thus providing a warning signal while utilizing the spotlight feature; (5) continuous operation of the spotlight while the colored lights are off, thus providing for an improved power-assist highly maneuverable spotlight having unobstructed 360° utilization.

13 Claims, 8 Drawing Figures

ROTATING WARNING LIGHT WITH AN INTEGRATED SPOTLIGHT

BACKGROUND OF THE INVENTION

1. Field of the Invention

This invention relates to rotating warning lights for use with emergency type vehicles.

2. Description of the Prior ARt

A patent search disclosed the following patents: the Heehler U.S. Pat. No. 2,677,121; the Roth et al. U.S. Pat. No. 2,699,536; the Kennelly U.S. Pat. No. 2,762,994; and the Cardarelli et al. U.S. Pat. No. 3,117,302. The Heehler U.S. Pat. No. 2,677,121 and the Roth et al. U.S. Pat. No. 2,699,536 both pertain to a combination of a warning or a signal light and a headlight for vehicles. The Kennelly U.S. Pat. No. 2,762,994 and the Cardarelli et al. U.S. Pat. No. 3,117,302 patents both pertain to rotating signal lights.

Incorporating a warning light with headlights has distinct disadvantages, e. g., the signal or warning light is visible from the front of the vehicle only and is of insufficient height to be readily visible even to approaching traffic, i. e., the lights could be obstructed by other vehicles.

The Kennelly U.S. Pat. No. 2,762,994 and the Cardarelli et al. U.S. Pat. No. 3,117,302 patents disclose structure which is currently utilized on a widespread basis on emergency type vehicles.

Certain rotating signal lights known to the applicant include a plurality of colored lights and one clear light. This clear light operates in unison with the colored lights to provide a wig-wag effect, i. e., the intermittent white incandescent flash attracts more attention than the colored bulbs. Usually, clear sealed beam lightbulbs are utilized in a rotating signal light and the weatherproof dome is colored to give the desired effect, i.e., blue or red. Obviously, in order to achieve the wig-wag effect it is necessary that the weatherproof dome be clear and that the color be achieved by selecting sealed beam bulbs having the desired colored lenses.

Many emergency type vehicles include one or two spotlights in addition to the rotating signal light. The usual location for a spotlight is adjacent the front doorpost. A spotlight so located is limited in azimuth since the vehicle to which it is attached creates an obstruction in directing the beam rearwardly. A further disadvantage is that the moving parts of the spotlight are exposed to the weather and tend to corrode and bind resulting in difficult operation thereof and frequent malfunction or breaking of the fragile parts.

A third disadvantage to the conventional spotlight is that the spotlights and other apparatus peculiar to the emergency type vehicle are removed when the vehicle is disposed of, i. e., to be replaced on the new vehicle. The labor involved in the replacement of conventional spotlights and the other apparatus is rather expensive.

SUMMARY OF THE INVENTION

The present invention is directed towards overcoming the disadvantages and problems relative to previous rotating warning lights and/or spotlights. The concept of the present invention is to integrate a spotlight with the rotating warning light.

A prerequisite for a rotating warning light used on emergency vehicles is that it be simple to operate so that the driver of the vehicle will not become confused in the operation thereof. Conventional switches and other control apparatus known by the applicant could be used to operate an integrated spotlight and warning light. However, any degree of confusion in the operation thereof would greatly negate the practicality of the device.

Accordingly, an important feature of the present invention is my composite switch having a single handle for actuating four separate micro single pole double throw switches in conjunction with structure yet to be disclosed.

The present invention comprises grouping a plurality of lightbulbs having colored lenses, e. g., preferably three red or blue bulbs, and at least one lightbulb having a clear lens defining a spotlight under certain conditions. The device includes: (1) a horizontal or azimuth motor for rotating the plurality of lights about a vertical axis; (2) an elevation motor for remotely pivoting the spotlight about a horizontal axis so the beam therefrom may be lowered or raised; (3) structure providing for continuous operation of the entire group of lightbulbs simultaneously while they rotate, thus providing a highly conspicuous wig-wag effect; (4) structure for selectively reversing the direction of rotation of the elevation and azimuth motors, thus facilitating optimum maneuverability of the spotlight; (5) structure providing for continuous operation of the spotlight bulb only, while simultaneously flashing the colored lights, thus providing a warning signal while utilizing the spotlight feature; (6) structure providing for continuous operation of the spotlight bulb only, while the colored lights are off, thus providing for an improved power-assist highly maneuverable spotlight having an unobstructed 360° azimuth and substantially 90° elevation utilization.

The above functions are not feasible if the operator of the vehicle is expected to operate numerous switches in order to accomplish the desired result, e. g., one switch for the elevation motor, another switch for the horizontal motor, and other switches for the operation of the lights.

In other words, feasibility of the above enumerated functions primarily depends on implementing my composite switch, which is an important feature of this invention. The composite switch comprises grouping a plurality of microswitches in an unusual manner. In other words, the group of microswitches are radially arranged with the respective tripping mechanisms thereof directed inwardly, defining a socket centrally thereof. The switches are fixedly attached one to the other, and an elongated lever or handle is positioned within the socket and pivotally attached for universal movement within the socket so that manipulation thereof causes a portion of the lever to selectively engage each of the tripping mechanisms separately or causes the portion thereof to simultaneously engage an adjacent pair of the tripping mechanisms. The microswitches are connected to the elevation and azimuth drive motors in such a manner that side to side movement of the lever causes the azimuth drive motor to rotate in a forward or reverse direction respectively and up and down movement of the lever causes the elevation drive motor to rotate in a forward or reverse direction respectively. Accordingly, the elevation and azimuth drive motors both may be operated simultaneously when the lever is moved diagonally. This provides the operator with a very simple and effective way of quickly causing the beam of the spotlight to be directed in any desired direction.

DESCRIPTION OF THE PREFERRED EMBODIMENT

The rotating warning light having an integrated spotlight of the present invention is character referenced herein by the numeral 11 and is intended to be mounted on the roof of an emergency vehicle or the like. The warning light or device 11 of the present invention generally comprises a plurality of colored lightbulbs 13, e. g., preferably three, and at least one clear lightbulb 15, all of which are mounted on a rotating platform 17. The device 11 also includes a base 19 which preferably is attached to a surface S, e. g., the roof of a vehicle (not shown), a horizontal or azimuth drive motor 21 fixedly attached to the base 19 for rotatably driving the platform 17, an elevation drive motor 23 fixedly attached to the platform 17 for selectively driving the clear lightbulb 15 about a horizontal axis, and control apparatus interconnecting certain of the above components with a power source, e. g., a battery 25 or the like, for selectively operating the colored light-bulbs 13, the clear lightbulb 15, the azimuth drive motor 21, and the elevation drive motor 23. An important feature of the present invention is my composite switch 27, as best viewed in FIGS. 5 – 8 of the drawings and which will be fully appreciated and more apparent when the remaining structure has been disclosed.

The colored lightbulbs 13 are fixedly attached to the platform 17 in any well known manner, e. g., like that shown in the Cardarelli et al. U.S. Pat. No. 3,117,302. It should be understood that the colored lights 13 are symmetrically arranged on the platform 17 so that the beams therefrom are directed outwardly from the device 11 in as many different directions as there are lights 13. A pair of platelike members 29, having the lower ends thereof fixedly attached to the platform 17 in any well known manner, as by welding or the like, are directed upwardly from the platform 17 so as to straddle suitable frame structure for receiving the lightbulb 15, e. g., like that shown in the U.S. Pat. No. 3,117,302.

Figure 1:
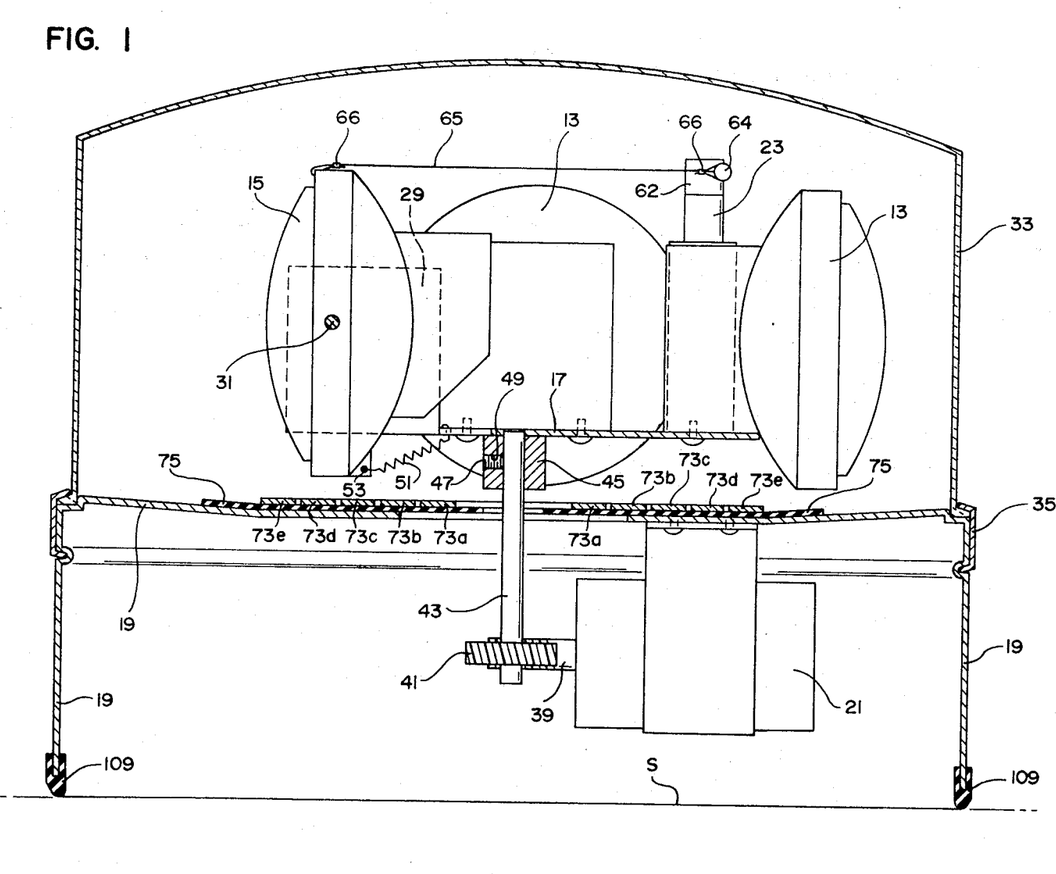
FIG. 1 is a vertical section taken near the center of the warning light of the present invention.
Figure 2:
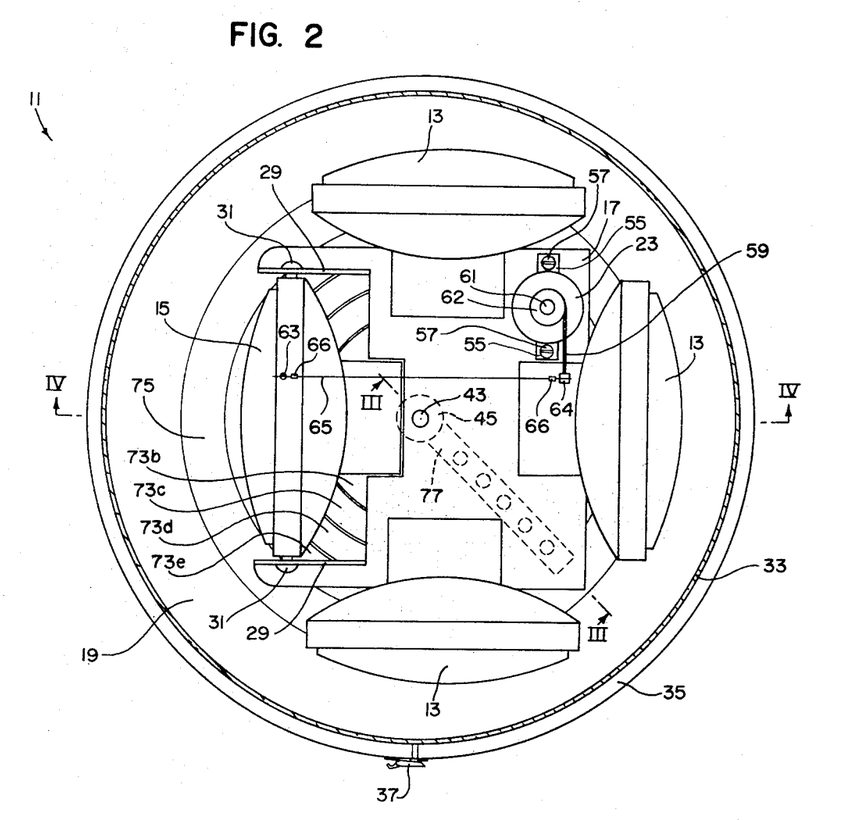
FIG. 2 is a plan view of the light of the present invention shown with the uppermost portion of the transparent dome broken away for clarity.

The clear lightbulb 15 is pivotally attached to the platelike members 29 by a pair of horizontally disposed pivot pins 31, as best viewed in FIGS. 1 and 2 of the drawings.

From FIG. 1 of the drawings, it may be seen that the device 11 preferably includes a transparent dome 33. The dome 33, preferably formed from plastic or the like, is removably attached to the base 19 by an annular band 35. The band 35 preferably includes a trunk-type latch 37 (FIG. 2) facilitating quick removal of the dome 33, in a manner obvious to those skilled in the art.

From FIGS. 1 and 2 of the drawings, it may be seen that the clear light 15 is positioned closer to the center of the device 11 than are the colored lightbulbs 13 so that the clear bulb 15 will not come in contact with the dome 33 when being pivoted about the pivot pins 31 in a manner yet to be disclosed.

From FIG. 1 of the drawings, it may be seen that the azimuth drive motor 21 is suitably attached to the base 19 and includes a rotating worm gear shaft 39 meshingly engaging a spur gear 41 which is fixedly attached to the one end of a vertically disposed shaft 43, all of which being in a manner obvious to those skilled in the art, e. g., like that shown in the U.S. Pat. No. 3,117,302.

A sleeve 45 is fixedly attached to the underneath side of the platform 17 centrally thereof as by welding or the like. The sleeve 45 receives the upper end of the shaft 43 and is suitably secured thereto in any well known manner, e. g., a set screw 47 received in a threaded transversal bore 49 in the sleeve 45.

From the foregoing, it should now be apparent that energizing the azimuth drive motor 21 causes the platform 17 to rotate about a vertical axis and the lights 13, 15 and the elevation drive motor 23, being mounted on the platform 17, are carried therewith. The azimuth drive motor 21 preferably is a typical permanent magnet type so that the direction of rotation thereof may readily be reversed for reasons yet to be disclosed.

One end of a tension spring 51 is swingably received in an aperture 53 adjacent the lowermost portion of the structure supporting the clear bulb 15 and the other end thereof is swingably received in a second aperture (not shown) in the platform 17. The spring 51 yieldably urges the bulb 15 to rotate about the pivot pins 31 so as to tilt the beam therefrom downwardly or cause the bulb 15 to rotate in a counterclockwise direction as viewed in FIGS. 1 and 4 of the drawings.

Figure 4:
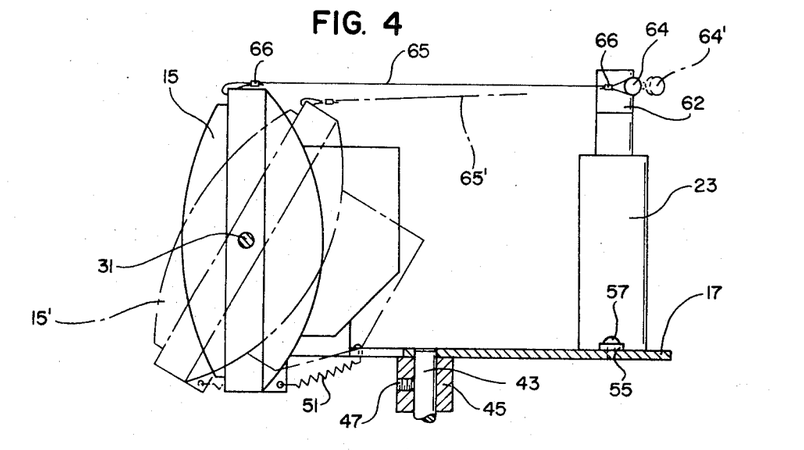
FIG. 4 is a partial sectional view taken as on the line IV—IV of FIG. 2 showing the spotlight and the elevational drive motor for tilting the spotlight about a horizontal axis.

From FIG. 4 of the drawings, it may be seen that mechanical linkage connects the upper portion of the structure supporting the bulb 15 with the elevation drive motor 15. In other words, numerous well known techniques may be employed for connecting the output of the motor 23 so as to cause the bulb 15 to be driven about the pivot pin 31, however, I prefer that the motor 23 be arranged substantially as illustrated in FIG. 4 with the rotating axis thereof being vertically disposed with the lower portion thereof resting on the platform 17.

Additionally, the motor 23 is conveniently secured to the platform 17 in any well known manner, e.g., a pair of outwardly directed lugs 55, being fixedly attached to the motor 23 as by welding or the like, are provided with apertures (not shown) for receiving suitable rivets or bolts 57 in a manner well known to those skilled in the art. Also, it will be understood that motor 23 is an extremely high torque low speed integrated gear motor.

Further, an elongated rigid arm 59 is fixedly attached to a rotating output shaft 61 of the motor 23 in any well known manner, e. g., the inner end of the arm 59 may conveniently be attached to a sleeve 62 which is received by the shaft 61 and secured thereto by suitable set screws (not shown) or the like in a manner obvious to those skilled in the art. An aperture 63 adjacent the uppermost portion of the structure supporting the bulb 15 receives the one end of a wire rope member 65 or the like having the one end thereof doubled back and secured to an adjacent portion by a clamp 66, in a manner obvious to those skilled in the art.

Further yet, the opposite end of the wire rope member 65 is fixedly attached to the rigid arm 59 adjacent the outer end thereof in any well known manner, e. g., like that explained for the first end, using a second clamp 66 or the like. It should be understood that the outer end of the arm 59 includes a larger diameter portion 64 which is provided with a suitable annular recess for receiving a looped portion of the wire rope member 65.

From the foregoing, it should now be apparent that energizing the elevation drive motor 23 in one direction will cause the lightbulb 15 to rotate about the pivot pins 31 so as to tilt the beam therefrom upwardly to a position substantially as depicted in FIG. 4 and character referenced by the numeral 15'. Further, energizing the motor 23 in the opposite direction or clockwise, as viewed in FIG. 2, will allow the spring 51 to rotate the lightbulb 15 to a position illustrated in solid lines in FIG. 4 of the drawings.

It should be understood that numerous well known techniques may be utilized in conjunction with the motor 23 for tilting the lightbulb 15 without departing from the spirit and scope of the present invention. Additionally, I prefer that the motor 23 also be a typical permanent magnet type so that the direction of rotation thereof may be readily accomplished for reasons just disclosed.

It may be desirable that the bulb 15 be provided with dual filaments. In other words, a first filament 69 is arranged therein to project a narrow beamed spotlight therefrom and a second filament 71 is arranged therein to project a broad beamed floodlight therefrom, the filaments 69, 71 being selectively operated independently in a manner yet to be disclosed.

Figure 3:
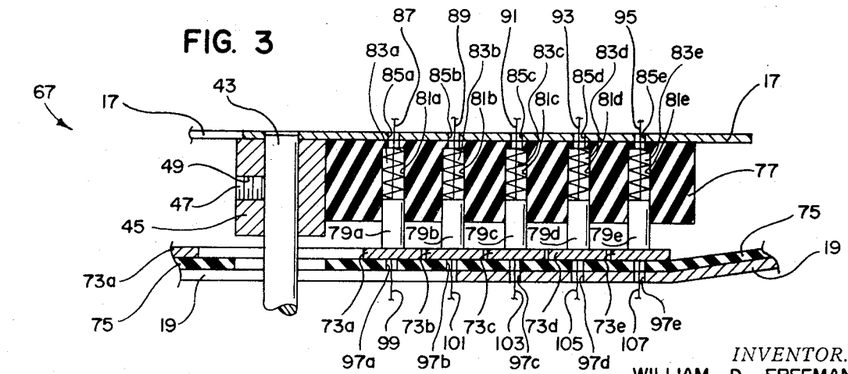
FIG. 3 is a sectional view taken as on the line III—III of FIG. 2.

From FIGS. 1 – 3 of the drawings, it may be seen that electrical power is transmitted to the just-disclosed apparatus mounted on the rotating platform 17 by incorporating a slip ring assembly 67. The slip ring assembly 67 comprises a plurality of highly conductive ring members 73a – 73e formed from brass or the like, an insulated annular plate member 75 fixedly attached to the base 19, and an insulated blocklike member 77 fixedly attached to the platform 17 for supporting a plurality of carbon brush members 79a – 79e or the like. In other words, the respective ring members 73a – 73e have coacting brush members 79a – 79e and the ring members 73a – 73e are arranged in a single plane at a spaced apart distance concentrically inward one from the other and are fixedly attached to the insulated plate member 75, in a manner obvious to those skilled in the art. Additionally, the respective brush members 79a – 79e are received in bores 81a – 81e, i. e., the bores 81a – 81e being in the member 77 at predetermined spaced apart distances, so as to slidingly engage a single one of the ring members 73a – 73e as the platform 17 rotates. Further, the respective brush members 79a – 79e are urged outwardly from the bores 81a – 81e by a like number of compression springs 83a – 83e.

Stated another way, the compression spring 83a urges the brush member 79a outwardly from the bore 81a so as to engage the brush 79a with the ring member 73a. The compression spring 83b urges the brush 79b outwardly from the bore 81b so as to engage the brush 79b with the ring member 73b, etc., for like members having suffixes c, d and e, as best viewed in FIG. 3 of the drawings.

The platform 17 is provided with a plurality of apertures 85a – 85e for respectively receiving a plurality of conductors 87, 89, 91, 93, and 95. One of the ends of the respective conductors 87 – 95 are fixedly attached to the brush members 79a – 79e in a manner obvious to those skilled in the art. The platelike member 75 is provided with a plurality of apertures 97a – 97e for respectively receiving a plurality of conductors 99, 101, 103, 105 and 107. It should be understood that the base 19 is provided with respective apertures suitably aligned with the apertures 97a – 97e which also respectively receive the conductors 99 – 107. One of the ends of each of the conductors 99 – 107 are respectively connected to the ring members 73a – 73e in a typical manner as by soldering or the like.

From FIG. 1 of the drawings, it may be seen that the device 11 preferably includes an annular resilient gasket 109. The gasket 109 preferably has a U-shaped cross sectional structure thereto for suitably engaging the lowermost portion of the base 19 in a manner obvious to those skilled in the art. The lowermost portion of the gasket 19 is intended to contiguously engage the mounting surface S in a manner which keeps the interior of the base 19 dry when the device 11 is exposed to adverse weather conditions, etc.

Figures 5, 6, 7, 8:
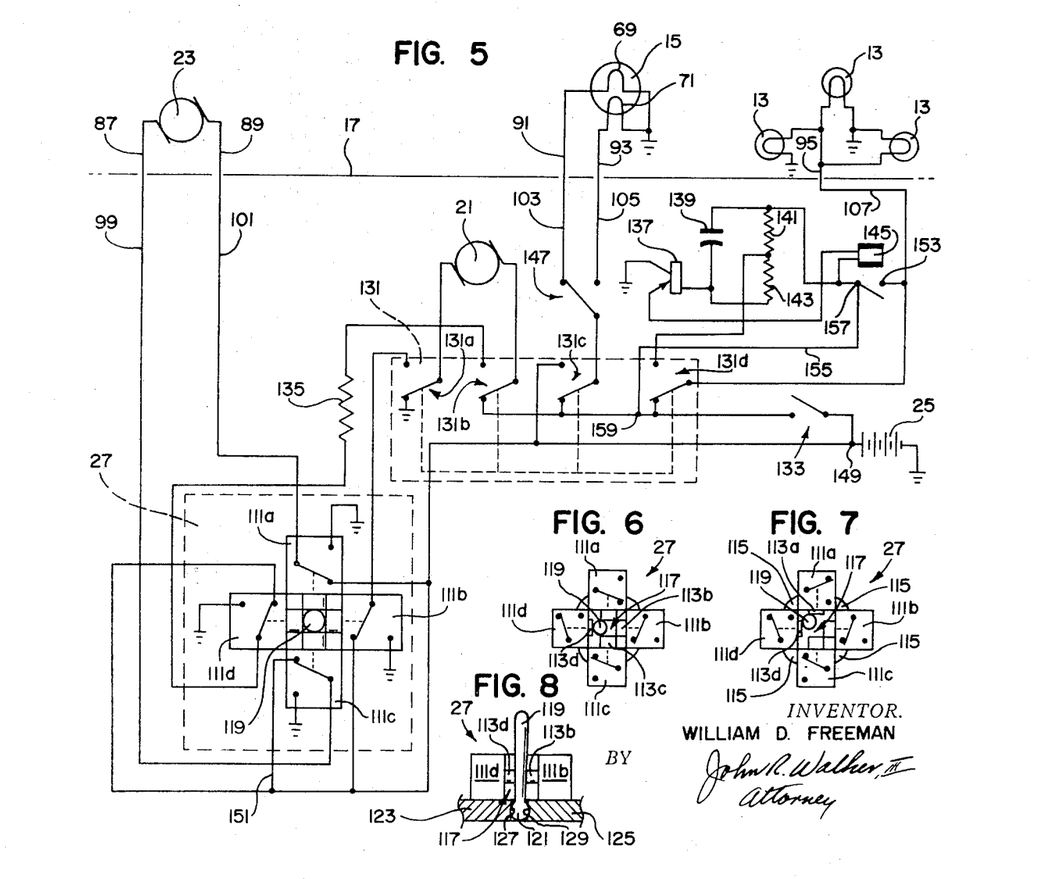
FIG. 5 is a schematic illustration showing the various electrical components of the device of the present invention and the interconnections thereof.
FIG. 6 is a plan view of the composite switch of the present invention, showing the lever engaging one of the plurality of microswitches.
FIG. 7 is a view similar to FIG. 6 showing the lever engaging an adjacent pair of microswitches.
FIG. 8 is a vertical section taken near the center of the composite switch showing the support structure for the lever in a preferred normal position between opposite microswitches.

Particular attention is now directed towards FIGS. 6 – 8 of the drawings wherein it may be seen that the composite switch 27 includes a plurality of individual microswitches 111a – 111d. The switches 111a – 111d respectively have typical tripping mechanism or plungers 113a – 113d which open and close certain contacts in a manner obvious to those skilled in the art. The switches 111a – 111d, being typical single pole double throw type, are radially arranged with the plungers 113a – 113d thereof being inwardly directed and are fixedly attached one with the other in any well known manner, e. g., I prefer an epoxy bonding agent 115 (FIG. 7) or the like. This arrangement of the microswitches 111 defines a socket 117 centrally thereof for receiving an elongated lever 119.

From FIG. 8 of the drawings, it may be seen that the lever 117 includes a ball 121 defining the lowermost portion thereof. The ball 121 is received between abutting platelike members 123, 125, i. e., the platelike members 123, 125 respectively are provided with partial sockets 127, 129 which, when brought together, form a substantially complementary socket conforming to the ball 121.

Accordingly, the upper end of the lever 119 projects outwardly of the socket 117 so that universal movement thereof may be effected. In other words, manipulation thereof causes a portion intermediate the ends of the lever 119 to selectively engage each of the plungers 113a – 113d separately as in FIG. 6 wherein the lever 119 is shown engaging the plunger 113d. Additionally, manipulation of the lever 119 may also cause the intermediate portion thereof to simultaneously engage an adjacent pair of the plungers 113a – 113d, e. g., as in FIG. 7 wherein the lever 119 is shown engaging and depressing the plungers 113a, 113d simultaneously. Obviously, depressing any one or a pair of the plungers 113a – 113d moves the internal structure of the appropriate switch, i. e., changes the connection from one throw to the other, in a manner obvious to those skilled in the art and as illustrated in FIGS. 6 and 7 of the drawings.

It should be understood that the plungers 113a – 113d are urged outwardly away from the main body portion of the switches 111a – 111e, i. e., towards the center of the group of switches 111a – 111e, as viewed in FIG. 5, by the usual springs associated with microswitches. However, the springs, being structure obvious to those skilled in the art, are not shown in the drawings. Accordingly, the lever 119 assumes a neutral position substantially as depicted in FIGS. 5 and 8 when manual force is not applied thereto. Additionally, the internal structure of the switches 111a – 111d assumes a position as depicted for the switches 111a – 111d in FIG. 5 of the drawings when the lever 119 is in the aforementioned neutral position.

Particular attention is now directed toward FIG. 5 of the drawings wherein it may be seen that the device 11 includes a four pole double throw switch 131, a single pole single throw switch 133, a resistor 135, a PNP transistor 137, a capacitor 139, a pair of resistors 141, 143, a relay 145, and a single pole double throw switch 147. Additionally, the rotating platform 17 is diagrammatically shown in FIG. 5 to better illustrate the interconnection of the structure mounted thereon. In other words, the slip ring assembly 67 connects the respective conductors 87, 99; 89, 101; 91, 103; 93, 105; and 95, 107 in a manner previously described and best illustrated in FIG. 3 of the drawings.

The lever 119 of the composite switch 27 in FIG. 5 is shown in the afore mentioned neutral position. A positive polarity is placed on one of the throws of each of the switches 111a – 111d, i. e., from a positive terminal 149 for the battery 25. The battery 25, preferably having a voltage output of 12 volts or the like, has the negative terminal thereof grounded.

The opposite throws of the respective microswitches 111a – 111d are grounded. The common terminal for the switch 111a is connected to one side of the elevation drive motor 23, i. e., through the conductors 89, 101. The common terminal for the microswitch 111c is connected to the opposite side of the elevation drive motor 23, i. e., through the conductors 87, 99. Moving the lever 119 upwardly (FIG. 5) throws the switch 111a so that the conductor 101 is grounded. Conversely, moving the lever 119 downwardly (FIG. 5) places a ground on the conductor 99. Accordingly, the direction of rotation for the motor 23 can readily be reversed by moving the lever 119 in opposite directions, e. g., moving the lever 119 upwardly causes the outer portion 64 of the arm 59 to move towards the position 64' which in turn causes the lightbulb 15 to rotate about the pivot pin 31 towards the position 15', in a manner previously disclosed.

Stated another way, when lever 119 is moved upwardly current comes from the battery 25 to the ground and enters the switch 111a from the ground terminal, thence across the switch 111a to the conductors 101, 89, thence through the armature windings of the motor 23, thence through the conductors 87, 99, thence to the switch 111c, thence from the switch 111c downwardly through a conductor 151 which is indirectly connected to the positive terminal 149. It should now be obvious to those skilled in the art that moving the lever 119 downwardly causes current to flow in the opposite direction through the armature winding of the motor 23 which causes the motor 23 to rotate in an opposite direction, e. g., the motor 23 drives the outer portion 64 of the arm 59 towards the position depicted by solid lines in FIG. 4 and the spring 51 urges the lightbulb 15 towards the position as shown therein by solid lines. Further, the rotation of the motor 23 may readily be accomplished as above described irrespective of the positions of the switches 131, 133, 147 and/or the relay 145 yet to be described.

The various poles of the four pole double throw switch 131 may hereinafter be identified one from the other, i.e., first poles 131a, second poles 131b, third poles 131c, and fourth poles 131d. The switch 131 has two positions, i. e., a "normal" position or spotlight "off" position, as shown in FIG. 5 of the drawings, and a "spotlight on" position. The switch 147 has a "spotlight" position as shown in FIG. 5 of the drawings and a "floodlight" position. The switch 133 has an "off" position as shown in FIG. 5 of the drawings, and a "warning light on" position.

The pole 131a has one throw thereof connected to ground and one of the throws of the poles 131b – 131d are common one to the other and indirectly are connected to a terminal of the switch 133, i. e., closing the switch 133 places a positive voltage on the poles 133b – 133d. The opposite throw of the pole 131a is connected to the common terminal of the microswitch 111b, the opposite throw of the pole 131b is connected to one side of the resistor 135, the opposite throw of the pole 131c is indirectly connected to the positive terminal 149, and the opposite throw of the pole 131d is connected to a junction joining the resistors 141, 143. The opposite side of the resistor 135 is connected to the common terminal of the microswitch 111d.

The common terminal of the pole 131a is connected to a terminal of the azimuth drive motor 21 and the other terminal of the motor 21 is connected to the common terminal of the pole 131b. The common terminal of the pole 131c is connected to the common terminal of the switch 147. The common terminal of the pole 131d is indirectly connected to a contact 153 of the relay 145 and to one side of the lights 13, i. e., the lights 13 being connected in parallel one with the other and having the respective opposite terminals thereof grounded.

From the foregoing, it should now be apparent to those skilled in the art that when the switch 131 is in the normal position, that closing the switch 133 energizes the lights 13, 15 and the motor 21. In other words, current leads the battery 25 through the ground connection and enters the lights 13 through their respective grounds thence through the conductors 95, 107, thence through the pole 131d, thence through the switch 133 to the positive side of the battery. Additionally, current leaves the battery 25 through the ground terminal, thence enters the light 15 through the ground terminal thereof, thence through the appropriate filament 69, 71, depending upon the position of the switch 147, thence through the switch 147, thence through the pole 131c, thence through the switch 133 to the positive side of the battery 25. Further, current leaves the battery 25 through the grounded terminal thereof, and enters the pole 131a through the grounded terminal thereof, thence through the pole 131a to the motor 21, thence through the armature windings of the motor 21, thence downwardly through the pole 131b, thence through the switch 133, thence to the positive side of the battery.

Accordingly, when the switch 133 is in the warning light on position and the switch 131 is in the normal position, the three colored lights 13 and the clear light 15 rotate about a vertical axis and the lights 13, 15 are illuminated which gives the illusion of flashing red lights with an intermittent clear or incandescent light, thus providing the previously described wig-wag effect. It should be pointed out that, if desired, the elevation drive motor 23 may be operated simultaneously so as to raise or lower the beam of the clear light 15 in a manner previously described. This may be beneficial if the vehicle is approaching a hill or for some other reason the vehicle operator wishes to raise the beam from the clear light 15, especially during the hours of darkness. Further, the switch 147 may selectively be moved to the flood position which will energize the filament 71 rather than the filament 69 so that the beam from the light 15 may be dispersed rather than concentrated in a narrow beam.

Placing the switch 133 in the off position and the switch 131 in the spotlight on position indirectly connects one side of the azimuth drive motor 21 to the common terminal of the switch 111b, i. e., through the pole 131a. Additionally, the other side of the motor 21 is indirectly connected to the common terminal of the switch 111d, i. e., through the pole 131b and the resistor 135. Further, the clear lightbulb 15 is connected to the positive terminal 149, i. e., through the switch 147 and the pole 131c. Further yet, the junction point between the resistors 141, 143 is indirectly connected to the contact 153 and the one side of the lights 13, i. e., through the pole 131d.

It should be understood that the resistor 135 is a voltage dropping resistor which under conditions yet to be described reduces the rpm of the azimuth drive motor 21. Various resistors would suffice for this purpose, however, I prefer that the resistor 135 be substantially 30 ohms and have a power rating of 10 watts, i. e., those values are selected for a 12 volt power source or battery 25.

It should now be apparent to those skilled in the art that when the switch 133 is in the off position, and the switch 131 is in the spotlight on position, spotlight 15 is on but the azimuth drive motor 21 ceases to rotate and the colored lights 13 are de-energized, i. e., the structure connected by the pole 131d will be fully disclosed later in the specification. Accordingly, the composite switch 27 may now be manipulated to energize the azimuth drive motor 21 in a forward or reverse direction in a manner similar to that previously described for energizing the elevation drive motor 23 in a forward or reverse direction. It should be pointed out that the resistor 135 enables the motor 21 to be operated by the switches 111b or 111a at a slower rpm than usual for enhancing the control of the spotlight.

More specifically, moving the lever 119 to the right, as viewed in FIG. 5, causes the common terminal of the switch 111b to be grounded which allows current to flow from the battery 25 through the ground, thence through the switch 111b, upward through the pole 131a, thence through the armature winding of the motor 21, thence downwardly through the pole 131d, thence through the resistor 135, thence through the switch 111d, thence to the positive terminal 149 of the battery 25. This causes the motor 21 to rotate in a forward direction.

Conversely, moving the lever 119 to the left, as viewed in FIG. 5 causes the common terminal of the switch 111d to be grounded which allows current to flow from the battery 25 through the ground to the switch 111d, thence through the resistor 135 upwardly thence through the pole 131b, thence through the armature winding of the motor 21 (in an opposite direction), thence through the pole 131a, thence to the common terminal of the switch 111b, thence to the positive terminal 149 of the battery 25. This causes the motor 21 to rotate in a reverse direction.

From the foregoing, it should readily be observed that the composite switch 27 readily controls the azimuth and elevation of the lightbulb 15, i.e., if the operator wants to raise the light, he moves the lever 119 upwardly, if he wants to lower the light, he moves the lever 119 downwardly, if he wants to move the light 15 to the left, he moves the lever 119 to the left, and if he wants to move the light to the right, he moves the lever 119 to the right. Additionally, the switch 27 selectively may be operated in a diagonal direction for energizing the azimuth and elevation drive motors simultaneously, e. g., if the operator wants to raise the light 15 and swing it around to the left at the same time, he moves the handle 119 diagonally upwardly and to the left, as best shown in FIG. 7 of the drawings. The other diagonal movements of the switch 27 and the corresponding responses of the azimuth and elevation drive motors should now be obvious to those skilled in the art.

A conductor 155 has the one end thereof connected to a contact 157 of the relay 145 and the other end thereof connected to a common point 159, i. e., the common point 159 being indirectly connected to one side of the switch 133. When the switch 131 is in the spotlight on position, as just described, closing of the switch 133 causes the colored lights 113 to flash on and off at a predetermined frequency. In other words, the colored lights 113 are constantly flashing and the lightbulb 15 is energized continuously, i. e., either the floodlight filament 69 or the spotlight filament 71 depending upon the position of the switch 147 as previously described.

The flashing of the colored lights 13 is accomplished by the interconnection of the transistor 137, the capacitor 139, the resistors 141, 143, and the relay 145. In other words, the lights 15 are placed in series with the resistor 141, i.e., a small amount of current leaves the battery 25 through the ground terminal and enters the parallel arrangement of colored lights 13 through the respective ground terminals thereof, thence through the conductors 95, 107, thence through the pole 131d, thence upwardly to the junction of the resistors 141, 143, thence upwardly through the resistor 141 establishing a voltage drop across the resistor 141, thence to the contact 157 of the relay 145, thence downwardly through the conductor 155 to the common point 159, thence through the switch 133, and finally to the positive terminal 149 of the battery 25. The voltage drop across the relatively high resistance of the resistor 141, as just described, causes the capacitor 139 to charge, i.e., the path of the charge being from the resistor 141 downwardly through the resistor 143 to one side of the capacitor 139, i. e., the other side of the capacitor 139 is connected to the positive side of the resistor 141. This places a negative voltage on the base of the transistor 137 which causes the transistor 137 to conduct. It should be pointed out that the RC time constant of the capacitor 139 and the resistor 143 will determine the flashing frequency.

In other words, current leaving the battery 25 through the ground terminal enters the collector of the transistor 137 and departs therefrom through the emitter which is connected to one end of the winding of the relay 145. The other end of the winding for the relay 145 is connected to the contact 157 which has a positive voltage thereon as previously described. When the transistor 137 conducts, the relay 145 is energized which completes the circuit between the contacts 153, 157. Closing the contacts 153, 157 in essence shorts out the resistor 141 so that the resistor 141 no longer has a voltage drop. Accordingly, closing the contacts 153, 157 places the full output of the battery 25 to the lights 13, i.e., current travels through the conductors 95, 107, thence through the contacts 153, 157, thence through the conductor 155 to the common point 159, thence through the switch 133, thence to the positive terminal 149 of the battery 25. It should be understood that the transistor 137 will conduct only as long as the charge remains on the capacitor 139. The capacitor 139 is discharging at a predetermined rate depending upon the values of the capacitor 139 and the resistor 143. Innumerous values would be acceptable for this purpose, however, I prefer that the capacitor 139 have a value of 550 mfd. and that the resistor 143 have a value of 470 ohms and a power rating of one-quarter watt. In this regard, I also prefer that the resistor 141 have a value of 1,000 ohms and a power rating of one-quarter watt.

The capacitor 139 discharges downwardly therefrom, thence upwardly through the resistor 143, thence through the pole 131d out the common terminal thereof, thence across the contacts 153, 157 of the relay 145, thence upwardly to the positive side of the capacitor 139. When the charge on the capacitor 139 has diminished to the point that the transistor 137 ceases to conduct, the relay 145 becomes de-energized which instantly de-energizes the colored lights 13. De-energizing the relay 145 opens the contacts 153, 157 which places the resistor 141 in series with the lights 13 causing a voltage drop across the resistor 141 again and the above described sequence repeats itself at a predetermined frequency depending upon the values selected for the capacitor 139 and the resistor 143 as previously described.

From the foregoing, it should now be apparent that the operator may have full control of the azimuth and elevation of the light 15, i. e., either spotlight or floodlight, while the colored lights 13 simultaneously are flashing at a predetermined frequency.

Although the invention has been described and illustrated with respect to a preferred embodiment thereof, it is not to be so limited since changes and modifications may be made therein which are within the full intended scope of the present invention.

I claim:

1. A warning light for mounting on the roof of a vehicle comprising a plurality of colored lightbulbs and at least one clear lightbulb, a platform, said colored and clear lightbulbs being arranged so that the beams therefrom are directed outwardly in different directions, said colored lightbulbs being fixedly attached to said platform, base means for fixed attachment to the roof of the vehicle, said platform being rotatably attached to said base means, an electrical power source, first electric motor means fixedly attached to said base means for rotatably driving said platform, pivot means pivotally attaching said clear lightbulb to said platform for allowing free pivot of said clear lightbulb about a horizontal axis, second electric motor means fixedly attached to said platform for selectively driving said clear lightbulb about said horizontal axis; and control means connected between said power source and said colored and clear lightbulbs and between said power source and said first and second motor means for selectively operating said colored lightbulbs, said clear lightbulb, and said first and second motor means.

2. The warning light of claim 1 in which said control means includes switch means connected between said power source and said first and second motor means for selectively operating said first and second motor means.

3. The warning light of claim 2 in which said switch means comprises a plurality of microswitch means, each of said microswitch means having plunger means for actuating said microswitch means, said plurality of microswitch means being radially arranged with said plunger means thereof being inwardly directed and each of said microswitch means being fixedly attached one with the other defining a socket centrally thereof; and elongated lever means, said lever means being disposed within said socket, means pivotally mounting said lever means for universal movement thereof, one end of said lever means projecting outwardly of said socket so that manipulation thereof causes a portion of said lever means to selectively engage each of said plunger means separately or causes said portion thereof to simultaneously engage an adjacent pair of said plunger means.

4. The warning light of claim 3 in which said switch means is adapted for selectively reversing the direction of rotation of said first and second electric motor means.

5. The warning light of claim 4 in which an opposing first pair of said microswitch means of said switch means respectively are interposed between said electrical power source and said first electric motor means so that as said lever means engages one of said first pair of said microswitch means said first motor means rotates in one direction and as said lever means engages the opposite of said first pair of said microswitch means said first motor means rotates in an opposite direction.

6. The warning light of claim 5 in which an opposing second pair of said microswitch means of said switch means respectively are interposed between said electrical power source and said second electric motor means so that as said lever means engages one of said second pair of said microswitch means said second motor means rotates in one direction and as said lever means engages the opposite of said second pair of microswitch means said second motor means rotates in an opposite direction.

7. The warning light of claim 3 in which said clear lightbulb comprises a narrow beam spotlight, and said control means additionally includes means for operating said spotlight independently from said colored lightbulbs and said microswitch means selectively operates respectively said first and second electric motors in either direction of rotation.

8. The warning light of claim 7 in which said control means additionally includes means for simultaneously operating said spotlight, said colored lights, and said first electric motor means continuously to display an illusion of sequentially intermittently flashing colored and clear incandescent beams of light.

9. The warning light of claim 6 in which said control means additionally includes means for intermittently operating said colored lightbulbs and for simultaneously continuously operating said clear lightbulb.

10. The warning light of claim 9 in which said control means additionally includes means for operating said clear lightbulb independently from said colored lightbulbs and includes resistor means for dropping a predetermined amount of voltage from said electrical power source to said first electric motor means when energized by either one of said first pair of said microswitch means of said switch means so that said first motor means rotates at a reduced RPM when said clear lightbulb is operated independently from said colored lightbulbs.

11. The warning light of claim 10 in which said clear lightbulb is provided with dual filaments, one of said filaments being arranged therein to project a narrow beamed spotlight therefrom, the other of said filaments being arranged therein to project a broad beamed floodlight therefrom, and each of said dual filaments being independently selectively operated by said control means.

12. The warning light of claim 11 in which is included means for transmitting electric power from said base means to said rotating platform.

13. The warning light of claim 12 in which said means for transmitting electric power from said base means to said rotating platform comprises a plurality of slip rings, insulated plate means fixedly attached to said base means, said slip rings respectively having coacting brush means fixedly attached to said platform and insulated therefrom, said slip rings being arranged in a single plane at a spaced apart distance concentrically inward one from the other and being fixedly attached to said insulated plate means.

* * * * *